United States Patent
Miller

(10) Patent No.: US 10,364,836 B2
(45) Date of Patent: Jul. 30, 2019

(54) PRECISION THREADED LOCATOR BUSHING

(71) Applicant: Elijah Tooling, Inc., Denton, TX (US)

(72) Inventor: Richard V. Miller, Denton, TX (US)

(73) Assignee: Elijah Tooling, Inc., Denton, TX (US)

( * ) Notice: Subject to any disclaimer, the term of this patent is extended or adjusted under 35 U.S.C. 154(b) by 635 days.

(21) Appl. No.: 14/063,567

(22) Filed: Oct. 25, 2013

(65) Prior Publication Data

US 2014/0115870 A1    May 1, 2014

Related U.S. Application Data

(60) Provisional application No. 61/718,585, filed on Oct. 25, 2012.

(51) Int. Cl.
*F16B 35/00*    (2006.01)

(52) U.S. Cl.
CPC ......... *F16B 35/00* (2013.01); *Y10T 29/49963* (2015.01)

(58) Field of Classification Search
CPC ...... F16B 25/10; F16B 25/103; F16B 25/106; F16B 35/00; F16B 35/04; F16B 35/06; F16B 39/04; F16B 39/06
See application file for complete search history.

(56) References Cited

U.S. PATENT DOCUMENTS

| | | | | |
|---|---|---|---|---|
| 1,897,196 A * | 2/1933 | Hunt | ............. | F16B 23/0084 411/389 |
| 2,092,653 A * | 9/1937 | Nielsen | ............. | B25D 5/00 29/407.1 |
| 2,377,397 A * | 6/1945 | Booth | ............. | F16B 25/0015 292/340 |
| 3,429,351 A * | 2/1969 | Szalanczy | ............. | F16B 13/0825 411/259 |
| 3,566,428 A * | 3/1971 | Neuschotz | ............. | F16B 5/01 470/8 |
| 4,043,239 A * | 8/1977 | DeFusco | ............. | F16B 5/0233 296/187.01 |
| 5,435,678 A * | 7/1995 | Stencel | ............. | B25B 27/143 411/109 |
| 5,755,542 A * | 5/1998 | Janusz | ............. | C21D 9/0093 248/58 |
| 6,361,258 B1 * | 3/2002 | Heesch | ............. | F16B 23/0084 411/178 |
| 6,439,817 B1 * | 8/2002 | Reed | ............. | F16B 37/125 411/110 |

(Continued)

*Primary Examiner* — Christopher M Koehler
(74) *Attorney, Agent, or Firm* — James E. Walton

(57) ABSTRACT

A locator bushing is used in combination with a receiving member, such as a fixture plate. The locator bushing is a single integral item having a driver portion and a threaded portion to locate and position devices in relation to the receiving member. The driver portion includes a first locating surface and a drive element. The first locating surface locates the locator bushing in the receiving member. The drive element is configured to receive a rotational force to rotate the driver portion. The threaded portion releasably engages the receiving member and is used to position the locator assembly within the receiving member. The driver portion includes a second locating surface to selectively locate and position an insert device relative to both the locator assembly and the receiving member.

15 Claims, 3 Drawing Sheets

(56) References Cited

U.S. PATENT DOCUMENTS

| | | | |
|---|---|---|---|
| 2003/0165355 A1* | 9/2003 | Lin | F16B 35/00 403/408.1 |
| 2004/0057810 A1* | 3/2004 | Breslin | F16B 13/126 411/383 |
| 2014/0086705 A1* | 3/2014 | Dawson | F16B 35/04 411/393 |

* cited by examiner

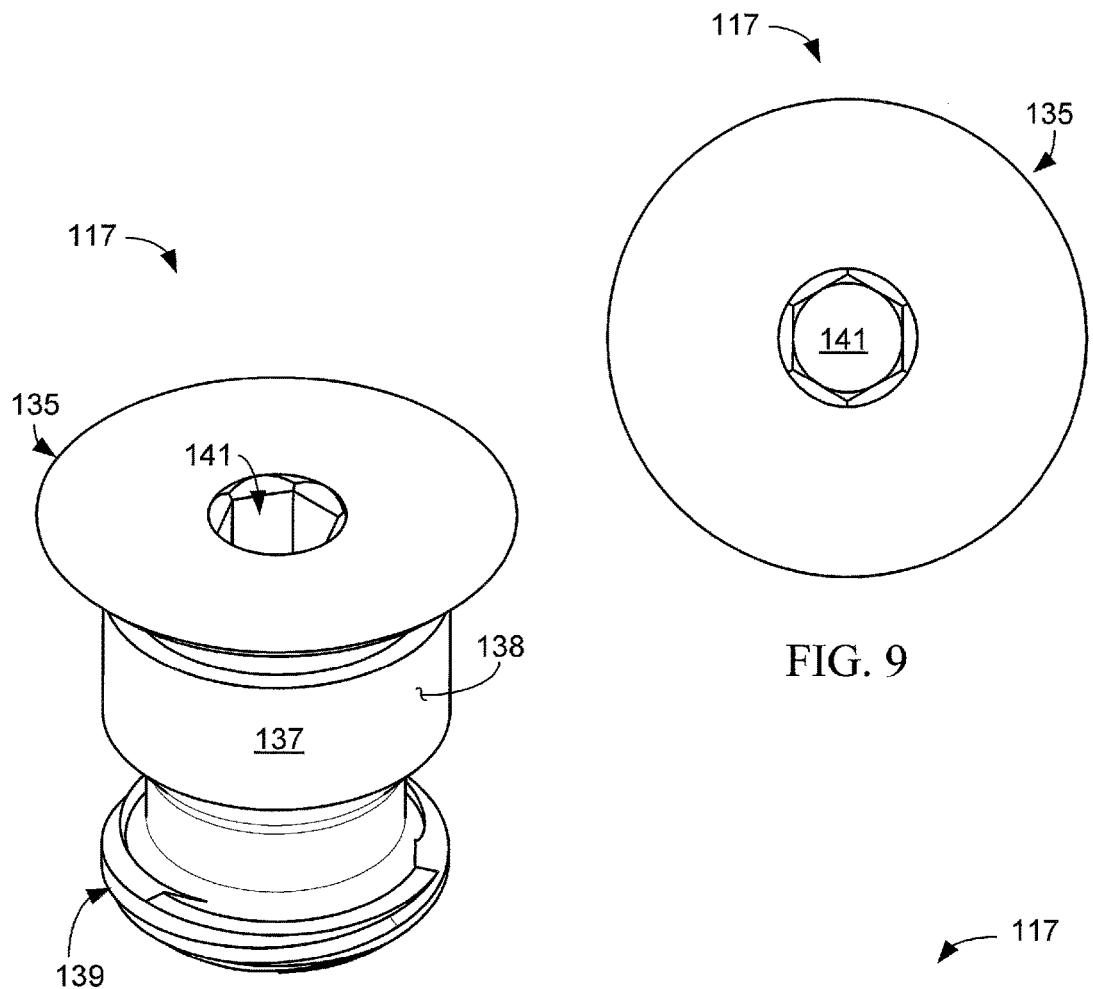
FIG. 8
FIG. 9
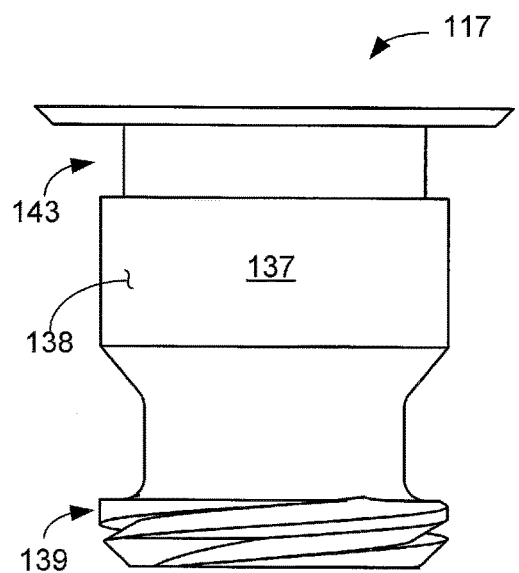
FIG. 10

PRECISION THREADED LOCATOR BUSHING

BACKGROUND

1. Field of the Invention

The present application relates generally to tooling equipment and, more particularly, to a bushed in-line threaded hole and plug.

2. Description of Related Art

Fixture plates are often used to position and secure materials during machining, processing, and working with a wide variety of castings, forgings, and parts. The fixture plates typically provision for multiple tooling components to be installed at selected locations in order to accommodate selected materials and workholding methods. Precise tolerances are often required when producing parts.

A number of working devices are used to support, secure, or locate the material on the fixture plate. In order to accept such devices, fixture plates typically use a threaded member in threaded engagement to the fixture plate and a separate bushing pounded into the fixture plate adjacent to the threaded member. Problems can arise during installation of the bushing wherein damage to the surface of the fixture plate can result as well as the difficulty of pressing the bushing properly. Additionally, removal of the bushing often requires great force and can damage the receiving holes in the fixture plates. Removal is often required when the surface of the fixture plate is to be resurfaced through skimming to remove marring and scarring that has occurred. The orientation of the threaded member and the bushing can also be slightly misaligned when installed or during adjustments. Given the separate nature of the bushing and the threaded member, it is fairly difficult to adjust the position of the bushing and threaded member relative to the fixture plate.

Although great strides have been made in tooling equipment, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 8-10 are views of a plug for use within the locator bushing of FIGS. 1-4.

Figure 1:
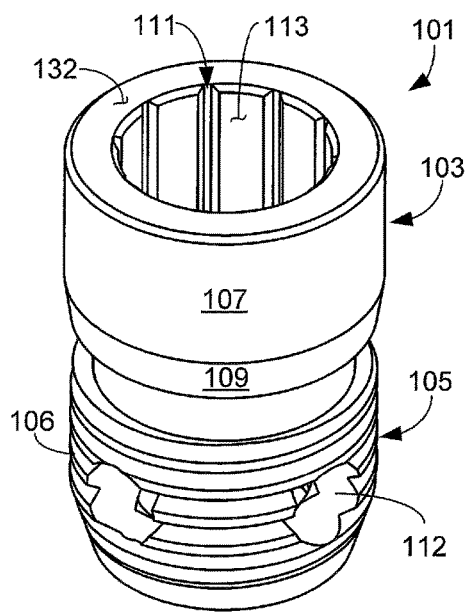
FIGS. 1-4 are views of a locator bushing according to the preferred embodiment of the present application.
Figure 2:
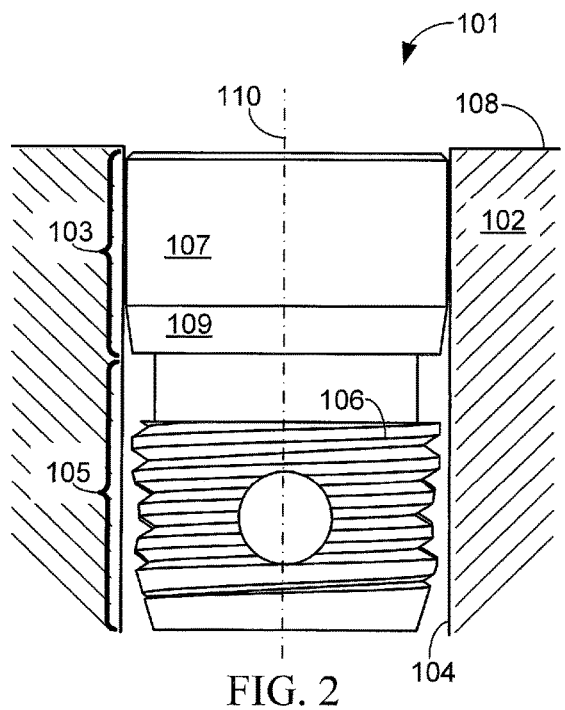

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIGS. 1-4 in the drawings, a locator bushing 101 is illustrated. Locator bushing 101 is a combination replacement of individual bushings and threaded inserts used to secure a working device to a fixture plate or receiving member 102. Receiving member 102 includes a bore 104 configured to threadingly receive locator bushing 101. External threads 106 associated with locator bushing 101 are configured to selectively translate locator bushing 101 within bore 104, such that the relative position of locator bushing 101 with respect to a surface 108 of receiving member 102 is maintained. Locator bushing 101 is secured to receiving member 102 through interference fit with threads 106 and internal threads of bore 104.

Locator bushing 101 is a singular member including a driver portion 103 integrally coupled to a threaded portion 105. Locator bushing 101 includes a central axis 110. Both driver portion 103 and threaded portion 105 are in a co-axial alignment with central axis 110. Locator bushing 101 is also hollow along central axis 110, thereby forming relatively cylindrical internal surfaces. The internal surfaces have varied diameters depending on the location and purpose of the surface with respect driver portion 103 and threaded portion 105.

Driver portion 103 and threaded portion 105 are made from similar materials but are exposed to different processes to achieve varied levels of hardness between them. Driver portion 103 may be hardened through any number of selected processes. For example, driver portion 103 is exposed to a nitride process of case hardening in the preferred embodiment. Such a process provides the benefit of dimensional stability wherein the dimensioning of driver portion 103 is unchanged as a result of the hardening process. It is understood that other processes may be used to harden driver portion 103, such as heat treatment. However, heat treatment may affect the dimensional sizing of locator bushing 101 and include secondary finishing steps. Use of a nitride process does not induce dimensional variation in the part nor require further finishing steps. Driver portion 103 is configured to primarily locate locator bushing 101 and to locate any insert devices received within locator bushing 101, and as such, is increasingly susceptible to dimensional variations and are difficult if not impossible to deal with. Threaded portion 105 is not hardened to the degree of driver portion 103.

Driver portion 103 includes a first locating surface 107 configured to locate locator bushing 101 within bore 104. A locating shoulder 109 is formed on the external surface (surface 107) of driver portion 103, adjacent threaded portion 105. Locating shoulder 109 forms a tapered section wherein the outside diameter of driver portion 103 is decreased approaching threaded portion 105. Shoulder 109 assists in aligning locator bushing 101 within bore 104 while driver portion 103 translates past surface 108 within bore 104. Locating shoulder 109 and locating surface 107 are configured to locate and align central axis 110 with the axis of bore 104. By utilizing first locating surface 107, the location of locator bushing 101 can be precisely maintained within receiving member 102 relative to a given reference location.

Threaded portion 105 is located beneath driver portion 103. Threaded portion 105 includes external threads 106 configured to engage threads within bore 104 to selectively position locator bushing 101 relative to surface 108 of receiving member 102. Locator bushing may be positioned so as to extend above or protrude past surface 108 in one position. In another position, locator bushing 101 may be recessed within bore 104. Threaded portion 105 securely holds locator bushing 101 relative to receiving member 102. Use of threads 106 allows locator bushing 101 to be quickly installed and removed from receiving member 102.

Threaded portion 105 is also optionally configured to be self tapping and include one or more ports or notches to assist in this feature. As seen in the figures, an example of a port or notch is aperture 112. Aperture 112 passes through threaded portion 105. Aperture 112 is optional along with any other ports or notches. In the preferred embodiment, locator bushing 101 is self tapping, but it is understood that some embodiments may not require such a feature.

Driver portion 103 also includes a drive element 111 configured to receive a rotational force to rotate locator bushing 101 bi-directionally, meaning in clockwise rotation and in counter-clockwise rotation. Drive element 111 is formed as indentions or grooves within internal walls of driver portion 103. Drive element 111 is configured to accept a driver of a selected pattern to rotate locator bushing 101. The type of pattern is selected so as to limit the chance of marring when torqued to specification.

Locator bushing 101 is configured to selectively function with any number of insert devices and operate as a system when an insert device is used. An insert device is a tool or member that is configured to engage and interact with locating bushing 101 to precisely and selectively support, secure, and/or locate a material relative to receiving member 102. An example of an insert device is a dowel pin 115 or a plug 117, seen in FIGS. 5-10. It is understood that other types of insert devices are known, such as shoulder screws, Xerts, rounded and flat supports, and pins to name a few. Insert devices are interchangeable and selectively releasable from one locator bushing 101 to another. Each insert device is sized to properly engage and operate with a respectively sized locator bushing 101. Locator bushing 101 and an included insert device form a locator bushing system.

A second or internal locating surface 113 is formed internally within driver portion 103. Second locating surface 113 is the internal wall of driver portion 103 discussed above in which drive element 111 is formed within. Locating surface 113 is configured to precisely locate the insert device relative to locator bushing 101 and receiving member 102. Locator bushing 101 is uniquely configured to integrate the drive element 111 within locating surfaces 113 to minimize space and increase functionality of the bushing 101.

Threaded portion 105 includes internal threads 119 configured to receive and engage with a threaded portion of the insert device. Threads 119 are used to releasably secure and position the insert device relative to surface 108. Locating surfaces 113 are used to locate the insert device relative to receiving member 102 as stated previously. However, not all insert devices may require a threaded engagement. For example, if the insert device was a support that merely supported an underneath surface of the material while other insert devices or vices are used to secure the material to the receiving member 102, then the need to retain the insert device through threaded engagement with locator bushing 101 is not required. In such a configuration the material itself could be used to apply a force sufficient to prevent the insert device from exiting locator bushing 101. The insert device may be used to merely support but not position or locate the material.

Figure 3:
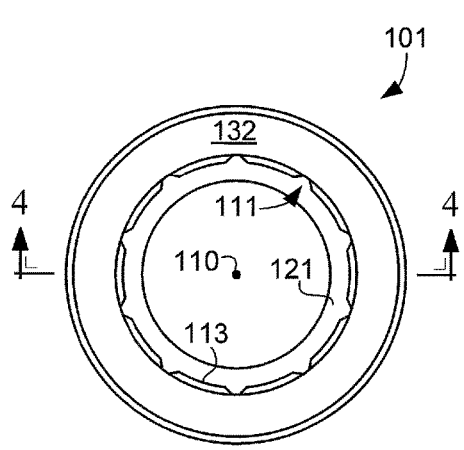
Figure 4:
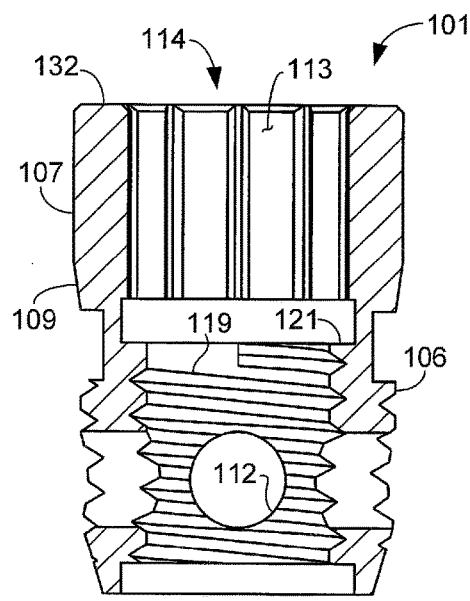

Therefore, as seen in FIGS. 3 and 4 particularly, locator bushing 101 includes an internal shoulder 121. Shoulder 121 serves as the upper portion of threads 119 and serves to form a generally planar surface. Shoulder 121 may be configured to accept contact from an insert device and prevent the passing of the insert device through locator bushing 101. The position (height with respect to surface 108) of the insert may be controlled by translation of locator bushing 101 within bore 104. Additionally, drive element 111 may be used to prevent rotation of the insert device as well as surface 113 to locate the insert device. It is understood that locator bushing 101 can optionally include threads 119.

Figure 5:
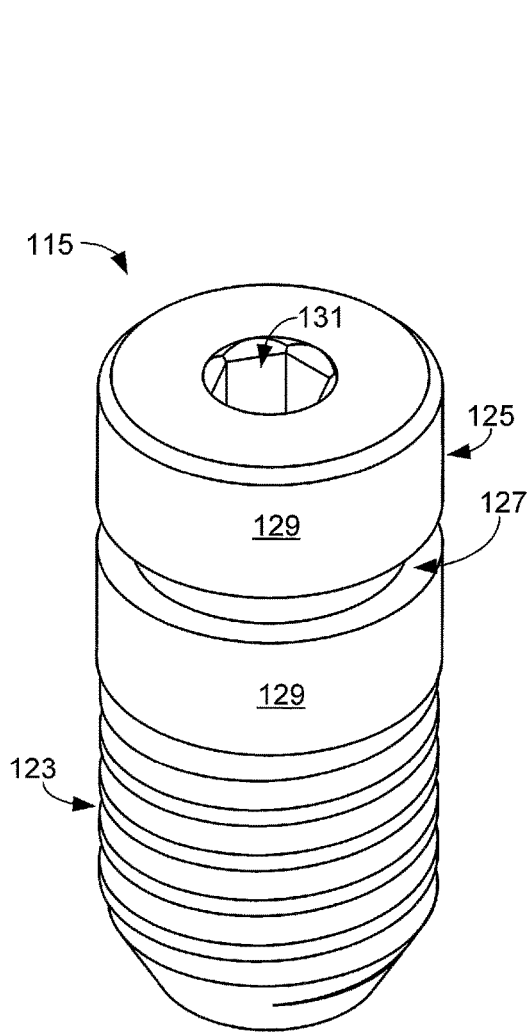
FIGS. 5-7 are views of a threaded dowel pin for use within the locator bushing of FIGS. 1-4.
Figure 6:
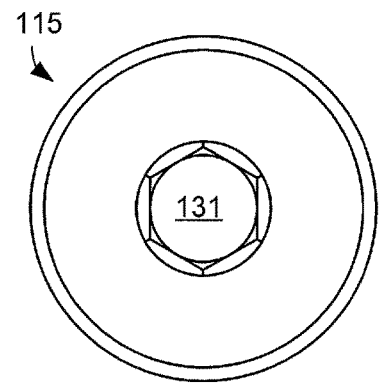
Figure 7:
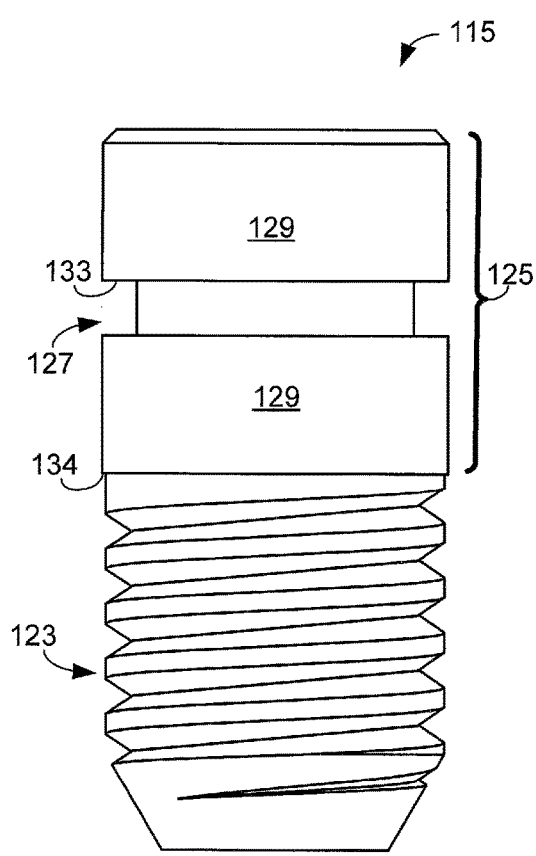

Referring now also to FIGS. 5-7 in the drawings, a dowel pin 115 is illustrated as an example insert device. Pin 115 is a type of round pin. Pin 115 is used to locate material with respect to receiving member 102. Pin 115 includes a threaded portion 123 and a head 125. Pin 115 is designed to be threadedly inserted into locator bushing 101, wherein head 125 can selectively alternate between one or more positions. For example, head 125 may protrude beyond surface 108 in one position and alternatively be recessed within driver portion 103 in another position.

Threaded portion 123 is an elongated cylindrical body having a relatively constant diameter concentrically aligned with head 125. Threaded portion 123 has threads on the exterior used to engage threads 119 of locator bushing 101. Threaded portion 123 may also include a groove 127 for acceptance of a sealing member, such as an o-ring, to prevent debris from entering the threads as head 125 is raised and lowered. Head 125 includes a locating surface 129 configured to contact surface 113 of locator bushing 101 to locate pin 115 relative to receiving member 102. Locating surface 129 may be above and/or below groove 127.

Pin 115 is adapted to accept a fastening tool for inducing a rotational force to rotate pin 115 into locator bushing 101. Pin 115 is shown having a bore 131. Bore 131 is adapted to accept a hex-head tool. However, the scope of pin 115 is not so limited, and, as such, bore 131 may be adapted to accept any other shaped tool, such as a Torx™. In operation, pin 115 may be threadedly raised and lowered in co-axial alignment with central axis 110 of locator bushing 101. When lowered, a lower surface 133, 134 of head 125 may optionally contact shoulder 121.

Referring now also to FIGS. 8-10 in the drawings, plug 117 is illustrated as an example insert device. Plug 117 includes a lid 135, a body 137, and a threaded portion 139. Plug 117 is configured to close and seal an opening 114 of locator bushing 101 to prevent passage of debris and material through the internal surfaces of locator bushing 101.

Threaded portion 139 is an elongated cylindrical body having a relatively constant diameter concentrically aligned with body 137 and lid 135. Threaded portion 139 has exterior threads used to engage threads 119 of locator bushing 101. Plug 117 is designed to be threadedly inserted into locator bushing 101, such that threads 119 engage with threaded portion 139. When plug 117 is in full threaded engagement, lid 135 is configured to contact a portion of driver portion 103, adjacent surface 132.

Plug 117 may also include a groove 143 for acceptance of a sealing member, such as an o-ring, to prevent debris from entering locator bushing 101. It is preferred that groove 143 be adjacent lid 117 but it is understood that other locations are possible and plug 117 should not be so limited to the illustrated position. Plug 117 includes body 137 with a locating surface 138 configured to contact surface 113 of locator bushing 101 to locate pin plug 117 relative to driver portion 103.

Plug 117 is adapted to accept a fastening tool for inducing a rotational force to rotate plug 117 into locator bushing 101. Plug 117 is shown having a bore 141. Bore 141 is adapted to accept a hex-head tool. However, the scope of plug 117 is not so limited, and, as such, bore 141 may be adapted to accept any other shaped tool, such as a Torx™. In operation, plug 117 may be threadedly raised and lowered in co-axial alignment with central axis 110 of locator bushing 101.

It is understood that plug 117 and pin 115 are merely exemplary embodiments of an insert device. Additionally, the outside diameters of body 137 and head 125 may be enlarged to engage shoulder 121 or may be as depicted wherein the diameter of the threaded portions 139 and 123 are the same as head 125 and body 137.

In order to locate, position, and secure an insert device like plug 117 and pin 115, locating bushing 101 is threaded into the receiving member 102 to a selected depth. A driver tool is used to engage drive element 111 to provide the rotational forces to raise and lower locating bushing 101. Once a desired position is reached, the driver tool is removed. An insert device is oriented in axial alignment with central axis 110 and placed within the locator bushing 101. Drive element is used to engage the insert device to rotate it in threaded engagement to a desired position. The insert device is translated (raised or lowered) to a selected position relative to receiving member 102. If threads are not utilized on the insert device, the insert device is oriented in alignment with the driver portion 103. Where applicable, the insert device is located against surfaces 113 of driver portion 103. Removal and/or position adjustment of the insert device is performed by applying rotational forces. It is understood that rotational forces may require a driver tool or may alternatively be "hand-tight" by a user's hand.

The current application has many advantages over the prior art including the following: (1) increased speed of operation; (2) threaded insertion of a bearing; (3) avoidance of potentially damaging a surface of a receiving member during installation; (4) fully integrated bushing and threaded portion; (5) simplified removal and interchangeability; and (6) ability to recess the bushing relative to the surface of the receiving member to permit resurfacing of the receiving member.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A locator bushing for use in a receiving member, comprising:

a driver portion including an external locating surface, a longitudinal smooth annular bore forming a longitudinal smooth annular internal locating surface, and a drive element, the drive element comprising longitudinal grooves formed within and projecting radially outward from the smooth annular bore of the driver portion, the grooves being configured to receive a rotational force to rotate the driver portion clockwise and counterclockwise; and a threaded portion permanently integrally coupled with the driver portion and configured to releasably secure the driver portion to the receiving member, such that the locator bushing may be repeatedly installed into and out of the receiving member without damaging the receiving member;

wherein the external locating surface locates the driver portion relative to the receiving member, and the smooth annular internal locating surface is a non-threaded surface for locating an insert device relative to the locator bushing;

wherein the smooth annular internal locating surface of the bushing contacts a longitudinal smooth non-threaded insert locating surface on the insert device when the insert device is engaged with the bushing;

wherein the longitudinal grooves of the drive element do not extend to the external locating surface; and wherein the driver portion and the threaded portion are in coaxial alignment.

2. The locator bushing of claim 1, wherein the driver portion is case hardened.

3. The locator bushing of claim 1, wherein the driver portion is configured to selectively translate relative to the receiving member.

4. The locator bushing of claim 1, wherein the threaded portion is self tapping.

5. The locator bushing of claim 1, wherein the threaded portion includes an aperture transverse with respect to the threaded portion.

6. The locator bushing of claim 1, wherein hardness levels of the driver portion and the threaded portion are varied.

7. The locator bushing of claim 1, wherein the threaded portion includes internal threads for selectively receiving, holding, and positioning the insert device.

8. The locator bushing of claim 7, wherein the internal threads are configured to releasably engage the insert device.

9. The locator bushing of claim 1, wherein the insert device is configured to engage at least one of the driver portion and the threaded portion;

wherein the driver portion is configured to be selectively positioned relative to the receiving member.

10. The locator bushing of claim 9, wherein the threaded portion includes internal threads, the insert device releasably engaging the internal threads to selectively position the insert device relative to the receiving member.

11. The locator bushing of claim 9, wherein contact between the insert locating surface on the insert device and the longitudinal smooth annular internal locating surface locates the insert device relative to the receiving member.

12. The locator bushing of claim 9, wherein the position of the insert device selectively translates within the bushing and alternates between two or more positions relative to and independently from a surface of the receiving member while the bushing is in a first bushing position.

13. The locator bushing of claim 9, wherein the insert device is a dowel pin.

14. The locator bushing of claim 9, wherein the insert device is a plug.

15. The locator bushing of claim 14, wherein the plug is configured to seal an opening of the driver portion.

\* \* \* \* \*